(No Model.)
R. H. THURSTON.
STEAM ENGINE.
No. 414,460. Patented Nov. 5, 1889.
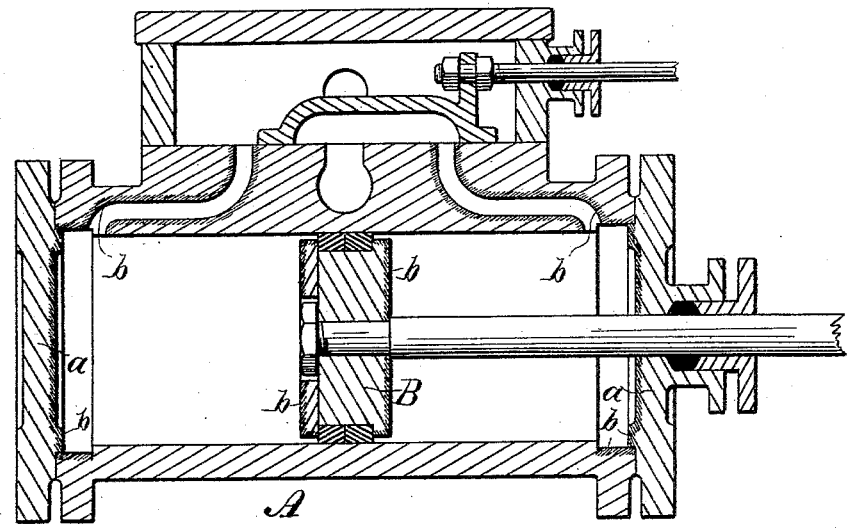
WITNESSES:
INVENTOR:
R. H. Thurston
BY Munn &Co.
ATTORNEYS.

UNITED STATES PATENT OFFICE.

ROBERT H. THURSTON, OF ITHACA, NEW YORK.

STEAM-ENGINE.

SPECIFICATION forming part of Letters Patent No. 414,460, dated November 5, 1889.

Application filed April 17, 1889. Serial No. 307,542. (No model.)

*To all whom it may concern:*

Be it known that I, ROBERT H. THURSTON, of Ithaca, in the county of Tompkins and State of New York, have invented new and useful Improvements in Steam-Engines, of which the following is a specification, reference being had to the annexed drawing, which is a longitudinal section of a steam-engine cylinder embodying my improvement.

In the operation of the steam-engine experiment and observation show that the great losses of heat, steam, and fuel which distinguish the real from the ideal engine, and which constitute the great part of the discrepancy between the computed thermo-dynamic efficiency and the efficiency of the engine in actual working, are due to waste of heat internally by the alternate absorption of heat by the metallic surfaces of the cylinder-heads and piston and the ejection of that heat later to the condenser, if it be a condensing-engine, or in non-condensing engines to the atmosphere. Many attempts have been made to reduce this loss by rendering the internal surfaces less-perfect conductors and absorbers of heat by superheating the entering steam and by "compounding" the engine. All of these methods are familiar to the engineer and have been more or less successful. The steam-jacket has also been employed, and the internal surfaces have been covered with non-conductors of heat by various inventors; but no device of this kind yet introduced or tested experimentally has been efficient.

The object of my invention is to provide an effective non-conducting surface for the internal surfaces of the steam-engine cylinder, formed integrally with the castings of which the engine is composed.

It is well known that the composition of ordinary cast-iron is largely graphitic, the carbon contained by the iron amounting to from two to three per cent. of the whole up to five or six per cent., according as the iron has been exposed to a higher or lower temperature in the blast-furnace and as a greater or less amount of fuel is burned in its reduction from the ore. It is also well known that a process of slow oxidation will remove the iron in part from the surface so exposed and leave the carbon in a somewhat compact form, which is held in place by a honey-combed mass of unoxidized iron. This mixture covers the surface of the solid iron to a depth depending upon the duration of the action of the oxidizing medium.

One of the best methods of securing the oxidation of the iron is to subject it to a dilute acid—say, for example, a solution of sulphuric acid in water in the proportion of one part of acid to ten of water. A weaker solution and a longer exposure would accomplish the same result. By actual experiment I have found that a piece of iron submitted to a very weak solution of acid for ten days produced good results.

In carrying out my invention I expose the internal parts of the engine (such as the heads of the cylinder, the two sides of the piston, the internal surfaces of the ports, and the clearance-space) to the action of such a solvent for a suitable length of time, thus converting those surfaces into highly-carbonized material, which is a poor conductor of heat. It is of course impracticable to so treat the rubbing surfaces; but as they are kept in a high state of polish their capacity for taking up heat is greatly lessened, and it is therefore less necessary to treat the surfaces subjected to friction.

In modern engines, especially those of a "high-speed" type, the cylinders are of large diameter and small length and the stroke of the piston is short, thus exposing large areas, which are effective in condensing the steam and reducing the efficiency of the engine. These large areas I propose to treat in the manner described to prevent the wasting of heat.

Referring now to the drawing, the interior surfaces of the heads *a* and the interior surfaces of the ports and passages of the cylinder A are provided with a coating *b* of graphite produced in the manner above described. Opposite sides of the piston B are treated in like manner.

In some cases, in addition to rendering the surfaces graphitic in the manner described, I shall fill the spongy surfaces so prepared with a substance which is a non-conductor of heat—such as oil, shellac, or other adhesive non-conducting materials—which will increase the non-conducting and heat-storing properties of the surfaces, and at the same time aid in giving them permanence in the presence of variations of temperature, pressure, and humidity, such as inevitably occur within the engine.

Having thus fully described my invention, I claim as new and desire to secure by Letters Patent—

1. A steam-engine cylinder provided with internal heat-insulating surfaces formed integrally with the parts of the cylinder, and a coating of oil or other non-conductor of heat applied to the heat-insulating surfaces, substantially as specified.

2. A steam-engine cylinder provided with internal heat-insulating surfaces formed integrally with the parts of the cylinder, substantially as described.

3. A steam-engine cylinder provided with internal heat-insulating surfaces of graphite formed integrally with the parts of the cylinder, substantially as described.

ROBERT H. THURSTON.

Witnesses:
 E. L. WILLIAMS,
 HORACE MACK.